Dec. 9, 1958
M. H. EMRICK
2,863,540
WEDGE-TYPE CLUTCHES
Filed Dec. 4, 1956
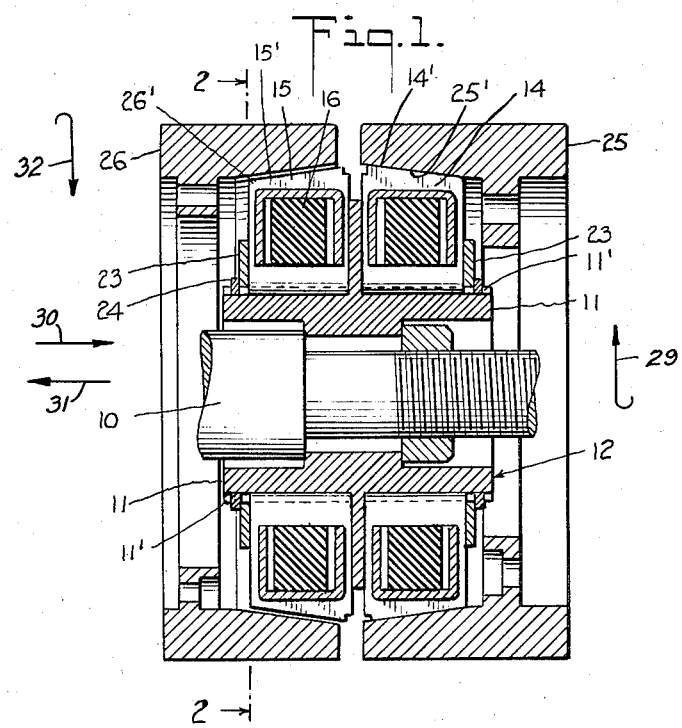
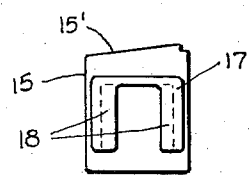
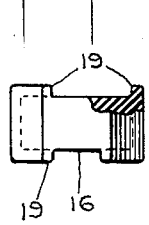
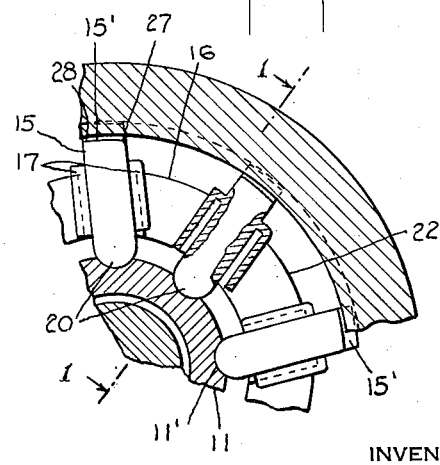
INVENTOR
MELVIN H. EMRICK
BY
*Howard C. Thompson*
ATTORNEY

United States Patent Office 2,863,540
Patented Dec. 9, 1958

2,863,540

WEDGE-TYPE CLUTCHES

Melvin H. Emrick, Manhasset, N. Y.; Dorothea A. Emrick, executrix of said Melvin H. Emrick, deceased Application December 4, 1956, Serial No. 626,258

13 Claims. (Cl. 192—43)

This invention deals with what are known as wedge-type clutches, as specifically disclosed in my prior application, Serial Number 596,208, filed July 6, 1956, of which this application is a continuation-in-part. More particularly, the present invention deals with a modified wedge construction, as well as modified means for coupling a plurality of wedges in forming a wedge clutch assemblage, whereby the wedges and the yieldable coupling for the wedges can be separately made, thus simplifying production and, wherein, assemblage of an annulus or ring of a multiplicity of wedges can be conveniently handled in assemblage in the clutch device.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view through a clutch made according to my invention.

Fig. 2 is a partial section on the line 2—2 of Fig. 1.

Fig. 3 is a side view of one of the wedges detached; and

Fig. 4 is a bottom plan view of one of the rubber couplings detached, with part of the construction broken away and in section.

In illustrating one adaptation and use of my invention, I have diagrammatically shown, in Fig. 1 of the drawing, two opposed clutch wedge units for operative engagement with forward and reverse drive conical drivers suitable for use in what are known as tapping attachments or other devices or mechanisms, wherein both forward and reverse drives from a drive shaft are required.

In Fig. 1 of the drawing, 10 represents a drive shaft, on which is mounted and keyed a hub portion 11, having a plurality of circumferentially spaced curved recesses or sockets 11', note Fig. 2. The hub portion 11 constitutes part of a forward and reverse drive unit 12. The hub portion includes a center fin or rib 13, at opposed sides of which are mounted forward drive wedge elements 14 and reverse drive wedge elements 15. The elements 14 and 15 are generally of the same construction, being shaped, however, to suit the forward and reverse drives required and, for this reason, only one of the elements will be specifically defined in this description.

The elements 14 and 15 are circumferentially spaced around the axis of the hub by rubber or yieldable coupling members 16 and, as these members are of the same construction throughout, they will be applicable to both wedge elements 14 and 15 and only one of the members 16 will be specifically shown.

Each of the wedge elements 14 and 15 have, on opposed sides thereof, yoke-shaped or U-shaped coupling portions 17, having channelled sides 18 for reception of laterally extended flanges 19 on the members 16 in establishing coupling engagement of a plurality of the wedge elements 14 and 15 in forming a ring-like unit readily mountable on the hub portion 11 by sliding inner rounded ends 20 of the wedges through the recesses 11', which open through at least one end of the hub 11, as noted in Fig. 1 of the drawing.

In other words, after assembling a predetermined number of the wedges 14, 15 with a plurality of the members 16, ring-like wedge units will be formed, defining a predetermined diameter, depending entirely upon the size of the elements 14 and 15 and the size of the coupling members 16 employed. In this connection, it will be understood that the shape and contour of the members 16 will vary in the dimensions of the inner contracted ends 21 and outer flared ends 22 of said members, as will be apparent from a consideration of Fig. 2 of the drawing. It will appear from a consideration of Figs. 1 and 2 of the drawing that the yieldable coupling members 16 as well as the coupling portions 17 are disposed within peripheral boundaries of the wedge elements 14 and 15.

In the same sense, the angularity of the flanges 19 will also vary to maintain the spacing of the wedge elements 14, 15 normally at the desired angular position with respect to the axis of the hub portion 11, or the drive shaft 10.

Again considering Fig. 1 of the drawing, it will appear that inner adjacent surfaces of the wedge elements 14 and 15 bear upon the fin or rib 13 and the wedge elements are held against displacement from the hub 11 by retainer rings 23 held in position upon the hub 11 by split rings 24.

At 25 and 26 are shown the forwardly and reversely actuated conical clutch drivers of any type and kind of mechanism and, for illustrative purposes, they can comprise the forward and reverse drivers of a tapping attachment as shown for example in Patent Number 2,613,786 of October 14, 1952. These drivers have inner bevelled surfaces 25', 26', respectively, in conjunction with which the wedge elements 14 and 15 operate as the shaft 10 is moved axially to bring these wedges into operative engagement with the drivers 25 and 26, the wedge elements 14 being shown in operative engagement with the forward driver 25 in Fig. 1 of the drawing. With the parts in this position, the elements 15 are out of engagement with the bevelled surface 26' of the driver 26.

The wedge elements 14 and 15 have outer ground bevelled surfaces 14', 15' at such a radius as to provide leading edges as, for example, at 27 in Fig. 2 of the drawing, which are closer to the axis of the shaft 10 than the rear edges 28, so that, as the wedges are moved into engagement with the respective bevelled surfaces 25', 26' of the drivers 25, 26, engagement of the edges 27 with the bevelled surfaces of the drivers will cause the wedges to rock to bring the surfaces 14', 15' into positive gripping engagement with the respective drivers 25 and 26. In this operation, the members 16 will yield and the wedge elements will rock or swing on their rounded pivot ends, as at 20, note Fig. 2.

In the operation of the clutch, when the unit 12 is in the position of Fig. 1, the forward driver 25 which is rotated in the direction of the arrow 29, Fig. 1, will correspondingly rotate the shaft 10, it being understood that the shaft 10 is urged in the direction of the arrow 30 by engagement of a tool operated by the shaft with a workpiece. As with other tapping attachments, a means, not shown, is provided for reversing the directional drive of the driver 26 so that when the shaft 30 is urged in the direction of the arrow 31 of Fig. 1 in outward feed of a tap from a workpiece, the unit 12 will be moved in the direction of the arrow 31, to bring the wedge 15 into operative engagement with the driver 26 which is rotated in the direction of the arrow 32 or, in other words, reversely to the rotation of the driver 25. In this last operation, the wedges 14 have been moved out of engagement with the driver 25 as will be apparent.

With clutch devices of the type and kind disclosed in my prior application herein noted, it has been essential to directly mould the wedges at spaced intervals on an annular ring-like coupling and supporting member of yieldable material. This construction necessitates considerable die or mould expense, particularly in construction of wedge-type clutches of different sizes. In contrast, with my improved construction, the wedges can be simply and easily formed, as well as the yieldable coupling members 16 and the annular wedge clutch assembly can be quickly and easily arranged and then mounted on the supporting hub. With this type of construction, it is only essential to modify the shape and contour of the coupling members in modifying the number of and spacing of the wedges in each clutch unit and, in some instances, the size of the wedge may be modified in adapting the resulting clutch wedge assembly to clutches of different sizes and construction.

For purposes of description, the opposed sides of the elements 14, 15, having the coupling portions 17 thereon, may also be defined as opposed sides of adjacent elements and the coupling flanges 19 may be said to be ends of the members 16. Thus, 17 and 19 form interengaging means on ends of the members 16 and on opposed surface of adjacent elements.

Having fully described my invention, what I claim as new and desire to secure by Letters Patent is:

1. A forward and reverse drive wedge clutch, comprising a drive shaft, a hub mounted on said shaft, a pair of forward and reverse drive wedge units mounted on the hub, forwardly and reversely driven conical clutch devices encircling said forward and reverse drive units and adapted to be engaged thereby in axial movement of said drive shaft, each unit comprising a plurality of circumferentially spaced independent wedge elements and intermediate coupling members of yieldable material spacing said wedge elements circumferentially of the hub, and interengaging means, on opposed surfaces of adjacent elements and on ends of said coupling members, for retaining the elements and members in assembled relationship with each other.

2. A structure as defined in claim 1, wherein the hub includes two series of circumferentially spaced transversely curved recesses, and said wedge elements including rounded ends fitting in the recesses of said hub in providing pivotal movement of the wedges on said hub.

3. A structure as defined in claim 2, wherein the wedge elements have outer bevelled surfaces shaped to provide leading edges closer to the axis of the shaft than opposed edges of said wedges, thereby causing rocking action of the wedges on said hub in movement of said wedge elements into operative engagement with the conical clutches.

4. A structure as defined in claim 1, wherein said yieldable coupling members are disposed within peripheral boundaries of said wedge elements.

5. A structure as defined in claim 1, wherein the last named means comprises U-shaped coupling portions on opposed sides of the wedge elements, and said coupling members including flanged ends engaging said U-shaped coupling portions.

6. A structure as defined in claim 5, wherein said U-shaped coupling portions and the peripheral dimensions of said coupling members are both disposed within peripheral boundaries of said wedge elements.

7. A structure as defined in claim 6, wherein means is provided, at opposed ends of the hub, for detachably retaining the wedge units against displacement from said hub.

8. In wedge drive clutch devices of the character described, a wedge drive unit comprising a plurality of similar wedge elements having protruding coupling means on opposed surfaces thereof, and means comprising yieldable coupling members engaging the protruding coupling means of said elements in yieldably supporting said elements in the form of a ring-like unit.

9. A structure as defined in claim 8, wherein the protruding coupling means of said wedge elements comprises U-shaped portions.

10. A structure as defined in claim 9, wherein said coupling members include projecting means operatively engaging the U-shaped portions of said elements.

11. A structure as defined in claim 10, wherein the U-shaped coupling portions and the peripheral boundaries of said members are both disposed within peripheral boundaries of the wedge elements.

12. A structure as defined in claim 1, wherein the wedge elements have rounded inner ends.

13. A structure as defined in claim 12, wherein the wedge elements have outer bevelled surfaces shaped to provide leading edges closer to the high point of the rounded inner ends than opposed edges of said wedge elements.

References Cited in the file of this patent
UNITED STATES PATENTS

| | | |
|---|---|---|
| 2,546,712 | Avila | Mar. 27, 1951 |
| 2,624,436 | Gamble | Jan. 6, 1953 |